Patented Aug. 12, 1941

2,252,110

UNITED STATES PATENT OFFICE 2,252,110

METHOD AND AGENT FOR BREAKING WATER-IN-OIL EMULSIONS

Bradshaw F. Armendt, Baytown, Tex., assignor to Standard Oil Development Company, a corporation of Delaware No Drawing. Application June 17, 1938, Serial No. 214,315

14 Claims. (Cl. 252—333)

The present invention is directed to a method for breaking emulsions of oil and water, especially of the water-in-oil type, and to agents for use in such a method.

In the production of crude oil, water or brine is frequently simultaneously produced. The turbulent action to which the mixture is subjected results in the dispersion of the water in the form of fine particles in the oil, the dispersion being so complete that a more or less permanent emulsion results. When oil is stored for refining purposes, the small amount of bottom sludge and water which remains in the crude after treatment to break this emulsion, accumulates from successive batches of oil and forms a very tight emulsion which is generally referred to as tank bottoms.

The object of the present invention is to provide a novel, inexpensive and efficient process for separating emulsions, of the kind referred to, into their component parts.

Novelty is imparted to the process of the present invention by virtue of the fact that a new demulsifying agent is employed, the actual procedural steps of the present process being substantially the same as those followed with other demulsifying agents. In general, the demulsifying agent of the present invention is used in small quantities. In large quantities it can be used as an emulsifying agent.

For obvious reasons it is desirable, if possible, to employ an agent derived from petroleum oil itself to break the above described emulsions. Accordingly, in the past many attempts have been made to use sulfonic bodies obtained by the treatment of mineral oil with sulfuric acid, such bodies usually being obtained as byproduct from the acid refining of lubricating oil and medicinal oils, as agents for breaking emulsions of such type. These sulfonic bodies may be divided into two general groups, sludge layer sulfonic bodies and oil layer sulfonic bodies. The former are water soluble and the latter are oil soluble. Individually, these sulfonic bodies are not wholly satisfactory as demulsifiers of water-in-oil emulsions since they act too slowly and must be assisted in their action by the use of undesirably high temperatures. Moreover, since these bodies are usually produced from heavy oils, the oil layer sulfonic bodies are normally solid substances and are difficult to handle and the sludge layer sulfonic bodies are of such high viscosity that they must be diluted for use.

Attempts have been made to supply the deficiencies of these types of sulfonic bodies by using them together. As is apparent from the various disclosures of the use of such mixtures in the prior art, it is necessary to use in conjunction with them some type of diluent, such as kerosene. The necessity of using a diluent adds to the cost of the demulsifying agent for a given potency.

According to the present invention a demulsifying agent of low pour point and of high potency is prepared by treating with sulfuric acid the extract obtained from naphthenic or mixed base crude oil or refined oil of the lubricating oil boiling range by the solvent action of solvents which have a selectivity for cyclic and unsaturated compounds. As examples of such solvents may be mentioned phenol, furfural, nitrobenzene and the like. Numerous other examples of such selective solvents may be found in the literature.

The exact chemical nature of the extract may vary depending upon the base stock, and may contain varying proportions of aromatics, naphthenes and unsaturates. In the following discussion and in the appended claims, these extracts, for the sake of simplicity, will be referred to as non-paraffinic.

The art of solvent extraction is almost universally practiced for the purpose of improving the V. I. of lubricating oils obtained from crude. The extracts obtained have always presented a problem since, while they are in the lubricating oil range, they are of a very low V. I. and, therefore, unsuitable for use in lubricating oils, and because of their high gravity and low aniline point are unsatisfactory for use as cracking stock. Various suggestions have been made to use these extracts in wood preservatives, insecticides and similar fields, but they still constitute an undesirable byproduct of oil refining which is not readily or profitably disposed of. The present invention provides one outlet for these extracts and, at the same time, satisfies the need of a satisfactory demulsifying agent which can be derived from petroleum oil itself which has long been recognized in the industry.

The demulsifying agents of the present invention are obtained, as previously indicated, by the treatment with concentrated or fuming sulfuric acid of extracts obtained from naphthenic or mixed base oils of the lubricating oil boiling range by the solvent action of selective solvents. The acid treatment is conducted in the same manner as it is on crude oils themselves. In general, the acid treatment is carried out by using first a small amount of acid, which is known as a cutter-dump, followed by a treatment with a larger amount of acid. Each treatment with acid is followed by a sludge settling step and a separation of the sludge from the oil.

The acid treatment may be divided into stages with an initial small cutter dump followed by a series of treats with a larger amount of acid. If desired, each stage may be preceded by a cutter dump. When a multi-stage acid treatment is employed it is generally desirable to discard the sludge from the first cutter dump and in some cases the sludge from the first main acid dump.

For the purpose of this invention, the total amount of sulfonic bodies produced by the acid treatment of the extract may be employed for demulsifying purposes, whether the acid treatment is carried out in one stage or in a plurality of stages. It has been found, however, that there is a rather marked difference between various fractions of the sludge. That is to say, when a multi-stage acid treatment is employed, the combined sludges of the first two stages may be superior to the combined sludges of the last two stages or of all the stages for certain emulsions. Likewise, the combined sludges of the last few stages may be more effective than those of the first stages or of all the stages for certain emulsions. Again, the extract itself may be separated into cuts of different boiling range and these cuts separately acid treated. For certain emulsions the sulfonic bodies obtained by the acid treatment of the first 40% overhead of an extract obtained from a lubricating oil of the usual boiling range has shown marked superiority over the product obtained by acid treating the whole extract or higher boiling cuts thereof.

The sulfonic bodies of the present invention may be used in the acid, alkaline or neutral state depending upon the particular type of emulsion to be treated. Some emulsions respond more readily to acid demulsifiers while others require a non-acid demulsifier. In any case, preliminary experiments must be made to determine exactly what type of demulsifier must be employed, since each emulsion presents an individual problem insofar as the question of whether the demulsifying agent should be acid or alkaline is concerned. When it is desired to use the sulfonic bodies in the neutral or alkaline state, they can be converted by treatment with caustic or ammonia, preferably the latter.

The sulfonic bodies of the present invention may advantageously be employed in connection with other mineral oil sulfonic bodies, particularly those obtained from the oil layer resulting from an acid treatment of mixed base oil boiling within the lubricating oil range; that is to say, the oil soluble sulfonic bodies, the production of which is described in U. S. Patents Nos. 1,387,835, 1,387,868, and 1,811,535. Due to the chemical nature of these extracts the sulfonic bodies derived therefrom usually have a low pour point, and, consequently, may be used in conjunction with these oil soluble sulfonic bodies without the employment of a diluent. In the event that a diluent is desirable, a hydrocarbon solvent such as kerosene or an alcohol, such as ethyl alcohol or isopropyl alcohol, may be employed.

The nature of the present invention will be better understood from the following examples in which are set forth illustrative procedural steps and operating conditions, and comparative tables demonstrating the superiority of the sulfonic bodies obtained from extracts over those obtained from the crude stock itself.

EXAMPLE I

A naphthenic or mixed base lubricating oil of Coastal origin having an A. P. I. gravity of 21.1, a vis./100° F. of 434, and a vis./210° F. of 51.7 was countercurrently extracted with 175% by volume of 97.5% phenol at 180° F. The phenol extract which represented 51.5% of the charge, had, after being stripped of phenol, an A. P. I. gravity of 15.6, a vis./100° F. of 953, a vis./210° F. of 59.4 and a viscosity index of −56.

The phenol extract and a distillate of the crude Coastal stock having the same viscosity at 210° F. as the phenol extract were treated separately with 98% sulfuric acid. The acid treatments were carried out in ten stages with the initial two stages being cutter dumps. The sludges from the cutter dumps were discarded and the sludges from the remaining stages were combined in each case.

The combined sludges were treated with water and steam to separate most of the sulfuric acid and oil and the residue was dissolved in water. The viscosity and pour point of the sulfonated bodies from the combined sludges obtained from the extract were lower than the corresponding properties of the bodies obtained from the combined sludes from the distillate. The sulfonated products which still contained up to 10% by weight of sulfuric acid and traces of oil were adjusted to the desired total solids content by the addition or evaporation of water as required. A sample of each of the products was rendered alkaline with an excess of ammonia.

In the following tables the acid sulfonic body from the Coastal distillate is designated as compound A, and the alkaline sulfonated body from the Coastal distillate is designated as compound B; the acid sulfonic body from the extract is designated as compound A' and the alkaline sulfonated body from the extract is designated as B'. The respective properties of these compounds were as follows:

| Source of demulsifying compound | Raw Coastal distillate | | Phenol extract | |
|---|---|---|---|---|
| Demulsifying compound type | A | B | A' | B' |
| Tests on demulsifying compound: | | | | |
| Total solids content_percent | 33.4 | 44.0 | 33.4 | 44.0 |
| Free ammonia content percent | | 5.21 | | 5.54 |
| Total acidity as $H_2SO_4$ percent | 9.55 | | 10.3 | |
| Absolute pour point °F | +40 | +15 | +25 | −25 |
| Furol viscosity @ 122° F | | 68 | | 24 |

These compounds were applied to emulsions of crude oil and water in the manner indicated in the following tables with the results indicated:

| Source of demulsifying compound | Raw Coastal distillate | Phenol extract |
|---|---|---|
| Demulsifying compound type | A | A' |
| Emulsion from | Amelia field | Amelia field |
| Treating agent/100 cc. of emulsion, cc. of 10% solution | 0.8 | 0.8 |

WATER SEPARATED

| Minutes in bath | Bath °F. | Cc. | Cc. |
|---|---|---|---|
| 0 | [1] 125 | | |
| 2 | 125 | 1.5 | 50 |
| 7 | 126 | 10.0 | 55 |
| 14 | 126 | 49.0 | 56 |
| 18 | 125 | 56.2 | 56.2 |
| 25 | 124 | 56.5 | 56.5 |
| Centrifuge results on oil layer: Bottom sediment and water | | Per cent 0.6 | Per cent 0.3 |

[1] All samples placed in hot water bath.

| Source of demulsifying compound | Raw Coastal distillate | Phenol extract |
|---|---|---|
| Demulsifying compound type | B | B' |
| Emulsion from | Goose Creek field. | Goose Creek field. |
| Treating agent/100 cc. of emulsion, cc. of 10% solution | 2 | 2 |

WATER SEPARATED

| Minutes in bath | Bath °F. | Cc. | Cc. |
|---|---|---|---|
| 0 | [1] 149 | | |
| 15 | 150 | 2.3 | 12.5 |
| 30 | 152 | 9.3 | 20.0 |
| 60 | 150 | 15.2 | 21.5 |
| 75 | 150 | 17.0 | 22.3 |
| Centrifuge results on oil layer: Bottom sediment and water | | Per cent 9.5 | Per cent 2.5 |

[1] All samples placed in hot water bath.

As can be seen from the above tables, the sulfonic bodies from the phenol extract were far superior to those obtained from the raw distillate of the same vis./210° F., both in the case of the acid agent and in the case of the ammoniated agent.

EXAMPLE II

A Sugarland crude was reduced to 77% bottoms which had an A. P. I. gravity of 21.1°, a vis./100° F. of 51.7, a viscosity index of 20, a flash point of 395° F., and a fire point of 440° F. Two separate portions of these bottoms, which will hereinafter be referred to as Stock C, were extracted with phenol under different conditions. One portion was extracted countercurrently at 120° F. with 160% by volume of anhydrous phenol, and the extract from this run was used for the preparation of a sulfonic body hereinafter termed Compound D. The other portion was extracted with 175%, by volume, of a 97.5:2.5 phenol-water mixture at 180° F., and during the extraction, 4% of water based on the phenol charged, was injected into the mixture. The extract from this operation was used for the preparation of a sulfonic body hereinafter referred to as Compound E. The significant specifications of the phenol extracts were as follows:

| | | Portion of bottoms | |
|---|---|---|---|
| | | First | Second |
| Yield of extract | Percent of charge | 51.5 | 40.6 |
| Inspections: | | | |
| Gravity | ° A. P. I. | 15.6 | 13.2 |
| Flash | ° F. | 390 | 380 |
| Fire | ° F. | 440 | 415 |
| Viscosity at 100° F. | | 953 | 983 |
| Viscosity at 210° F. | | 59.4 | 57.6 |
| Viscosity index | | −56 | −94 |

Each of these extracts was treated with several dumps of 96% sulfuric acid at a temperature of the order of 125° F. A ½ of 1% water break was applied after each acid dump to facilitate coagulation and settling of the sludge. As a further measure, to facilitate the settling rate, a temperature of 120–130° F. was maintained during the settling step.

In preparing Compound D the extract from the first portion of batch C was first treated with 5 lbs. of sulfuric acid per bbl. and then with 18 lbs. per bbl. Thereafter, eight 35 lbs. per bbl. acid treats, each preceded by a 5 lb. cutter dump were applied. Only the sludges derived from the 35 lb. treats together with those from the immediately preceding 5 lb. treats were utilized for demulsification purposes.

The preparation of Compound E diffused from that of Compound D in that the second portion of batch C was subjected to an additional 5 lb. cutter dump and an 18 lb. acid treat before the eight stages of 35 lb. acid treatment. In this case, also, the sludges of the 35 lb. acid treats and their preceding 5 lb. treats were combined to form Compound E referred to in subsequent tables. The yield of Compound D in bbls. per bbl. of batch C was 0.63, while the yield of Compound E was 0.47.

A portion of each of Compounds D and E were rendered alkaline with an excess of ammonia. The properties of the compounds before and after treatment with the ammonia were as follows:

| | Acid D | Alkaline D | Acid E | Alkaline E |
|---|---|---|---|---|
| Total solids | 33.6 | 44 | 33.5 | 43.6 |
| Total acidity as $H_2SO_4$ % | 11.5 | | 9.55 | |
| Free ammonia | | 5.54 | | 5.21 |
| Absolute pour point ° F. | | −25 | | −10 |

In order to compare the effect of Compounds D and E, both in the acid and alkaline state with that of a comparable sulfonic body prepared from unextracted crude, a cut of the same Sugarland crude was prepared having a vis./210° F. of approximately 57, or in other words, about the same as that of the extracts from batch C. This cut was characterized by a gravity of 21.3°, a vis./100° F. of 543, a flash point of 400° F. and a fire point of 430° F. This cut was treated with acid in the manner described for the productions of Compound D and yielded a sulfonic body which will be hereinafter referred to as Compound F, which, in the acid state, had a total solid content of 33.4 and a total acidity as $H_2SO_4$ of 9.55%, and in the alkaline state had a total solids content of 44%, a content of free ammonia of 5.21%, and an absolute pour point of +15° F. In the following tables are given the results obtained by treating different emulsions, with Compounds D, E and F. The compounds were used as 10% water solutions. The manner of conducting the demulsifying operation will be apparent from the data given. B. S. & W. means bottom sediment and water.

Emulsion from Conroe Field

[Age of emulsion when tested, 54 days]

| | | | Acid compound D | Acid compound E | Acid compound F |
|---|---|---|---|---|---|
| Treating agent/100 cc. of emulsion | | | Cc. 1 | Cc. 1 | Cc. 1 |
| Minutes | Bath °F. | | | | |
| 0 | 122 | All samples placed in bath. | | | |
| 9 | 125 | Water separated | 29 | 23.5 | 18.5 |
| | | Sludge | 1 | 5 | 1 |
| 17 | 126 | Water separated | 30 | 27.5 | 21 |
| | | Sludge | 0 | 2.5 | 18 |
| 27 | 128 | Water separated | 9.75 | 29.25 | 22.5 |
| | | Sludge | 0 | 0.75 | 12.5 |
| | | Pipe line oil | 70.25 | 70 | 65 |
| 47 | 128 | Water separated | 30 | 29 | 25 |
| | | Sludge | 0 | 1 | 8 |
| | | Pipe line oil | 70 | 70 | 67 |

| Centrifuge results: | Per cent | Per cent | Per cent |
|---|---|---|---|
| B. S. & W. | 0.05 | 0.05 | 0.15 |
| Water | 0 | 0 | 0 |

Emulsion from Goose Creek Field

[Age of emulsion when tested, 1 hour]
[B. S. & W. content 23–24%]

| | | Alkaline compound D | Alkaline compound F |
|---|---|---|---|
| Treating agent/100 cc. of emulsion | | Cc. 2 | Cc. 2 |

WATER SEPARATED

| Minutes | Bath °F. | Cc. | Cc. |
|---|---|---|---|
| 10 | [1] 149 | | |
| 15 | 150 | 15 | 2.5 |
| 30 | 152 | 21 | 10 |
| 60 | 150 | 22 | 15 |
| 75 | 150 | 22.5 | 17 |

| Centrifuge results: | Per cent | Per cent |
|---|---|---|
| B. S. & W. | 2.4 | 9 |
| Water | 2.4 | 9 |
| B. S. | 0 | 0 |

[1] All samples placed in bath.

EXAMPLE III

In order to examine the relative effectiveness of different fractions of the sulfonic bodies produced as described in Example II, a demulsifying agent was made up of the sludges resulting from the first two 35 lb. acid treats in the preparation of Compound D, and a second demulsifying agent was made up by combining the sludges resulting from the last two 35 lb. acid treats in the preparation of compound D. In the following tables, the first of these demulsifying agents will be referred to as Compound G and the second as Compound H. The properties of these demulsifying agents in both the acid and alkaline state were as follows:

| | Compound G | Compound H |
|---|---|---|
| Analysis: | | |
| Total solids percent | 43.5 | 44.4 |
| Free ammonia do | 5.32 | 5.48 |
| Physical tests: | | |
| Absolute pour °F | 5 | 5 |
| Furol viscosity at 122° F | 13 | 31 |
| pH of a 10% solution | 9.78 | 9.92 |
| Analysis: | | |
| Total solids percent | 33.4 | 33.1 |
| Total acidity as $H_2SO_4$ do | 10.3 | 13.7 |
| Physical tests: | | |
| Absolute pour °F | 25 | 25 |
| pH of a 10% solution | 0.94 | 0.99 |

An emulsion of crude oil and water, after standing for six hours, was treated with Compounds F, G and H. These compounds were used as 10% water solutions, and in each case 2 cc. of the treating agent were employed for each 100 cc. of emulsion. The emulsion initially contained 22–23% of bottom sediment and water. The results were as follows:

Emulsion from Goose Creek Field

[Age of emulsion when tested, 6 hours]

| Minutes | Bath °F. | | Alkaline compound F | Alkaline compound G | Alkaline compound H |
|---|---|---|---|---|---|
| | | | Cc. | Cc. | Cc. |
| 0 | 146 | All samples placed in bath. | | | |
| 10 | 145 | Water separated | 1 | 13 | 15 |
| 25 | 144 | Water separated | 3 | 22 | 18 |
| 35 | 145 | Water separated | 6 | 22 | 19 |
| | | Sludge | 0 | 0 | 0 |
| 45 | 146 | Water separated | 10 | 22.5 | 20 |
| | | Sludge | 0 | 0 | 0 |
| 60 | 151 | Water separated | 14 | 23 | 20.5 |
| | | Sludge | 0 | 0 | 0 |
| 75 | 150 | Water separated | 15.5 | 23 | 21 |
| | | Sludge | 0 | 0 | 0 |

| Centrifuge results: | Per cent | Per cent | Per cent |
|---|---|---|---|
| B. S. & W. | 10 | 1.2 | 4.0 |
| Water | 10 | 1.2 | 3.0 |
| B. S. | 0 | 0 | 1.0 |

An emulsion of crude oil and water which had stood 47 days and contained 56–57% of bottom sediment and water was treated with Compounds G and H, respectively, in the acid state. In each case, 0.8 cc. of treating agent per 100 cc. of emulsion were employed. The results were as follows:

| Minutes | Bath °F. | | Acid compound G | Acid compound H |
|---|---|---|---|---|
| | | | Cc. | Cc. |
| 0 | 125 | All samples placed in bath | | |
| 2 | 125 | Water separated | 2 | 48 |
| 7 | 126 | Water separated | 7 | 55.5 |
| 14 | 125 | Water separated | 41 | 56.5 |
| 18 | 124 | Water separated | 51 | 56.5 |
| | | Sludge | 8 | 0 |
| 25 | 124 | Water separated | 53 | 56.5 |
| | | Sludge | 4.5 | 0 |
| 45 | 126 | Water separated | 58.5 | 56.5 |
| | | Sludge | 4.5 | 0 |
| | | Pipe line oil | 42 | 43.5 |

| Centrifuge results: | Per cent | Per cent |
|---|---|---|
| B. S. & W. | 0.3 | 0.3 |
| Water | 0.3 | 0.2 |
| B. S. | 0 | 0.1 |

The same emulsion was treated with Compounds G and H in the alkaline state, using the same amount of treating agent. The results were as follows:

| Minutes | Bath °F. | | Alkaline compound G | Alkaline compound H |
|---|---|---|---|---|
| | | | Cc. | Cc. |
| 0 | 125 | All samples placed in bath | | |
| 10 | 125 | Water separated | 24 | 56.0 |
| 14 | 125 | Water separated | 28 | 57.0 |
| | | Partially broken emulsion (lace) | 32 | 0 |
| | | Pipe line oil | 40 | 43.0 |
| 28 | 125 | Water separated | 57 | 57 |
| | | Pipe line oil | 43 | 43 |

| Centrifuge results: | Per cent | Per cent |
|---|---|---|
| B. S. & W. | 0.4 | 0.3 |
| Water | 0.1 | 0 |
| B. S. | 0.3 | 0.3 |

From the above tables it can be seen that in some cases the combination of the sludges from the first two stages are superior to the combination of the sludges from the last two stages, while in other cases the reverse is true.

EXAMPLE IV

In order to observe the effect of the boiling range of the extract on the effectiveness of the demulsifying agent produced, the extract from which Compound D was produced, was distilled under a vacuum and the 0–40% overhead cut was recovered and treated with sulfuric acid to produce a demulsifying agent hereinafter referred to as Compound L. A heavy extract was prepared, by phenol extracting a heavy cut of the same crude, and was acid treated to produce a compound hereinafter referred to as Compound M. The relative physical characteristics of the base stocks for Compounds D, L and M were as follows:

| Inspections: | Base stock compound D | Base stock compound L | Base stock compound M |
|---|---|---|---|
| Gravity °A. P. I. | 15.6 | 15.2 | 11.1 |
| Flash °F. | 390 | 340 | 450 |
| Fire °F. | 440 | | 525 |
| Vis./100° F. | 953 | 251 | |
| Vis./210° F. | 59.4 | 42.5 | 200.7 |
| Viscosity index | −56 | −93 | |

Compound D was prepared as described in Example II. The preparation of Compound L differed somewhat in that an average treating temperature of 120° F. was maintained, and after the preliminary 5 and 18 pound dumps, the remainder of the acid was applied in the form of eight 40 lb. dumps, the 5 lb. cutter treats and water breaks being omitted. Compound L was made by combining the sludges from the 40 lb. treats.

The heavy extract used for the production of Compound M was mixed with an equal volume of kerosene and was then treated at 80° F. with equal dumps of 104.5% fuming sulfuric acid, the three combined being equivalent to approximately 410 lb. of 98% acid per bbl. of oil. Compound M was a composite of the sludges of these three acid treats. These three compounds were then treated for the adjustment of their total sludge content by the evaporation or addition of water, as required. The resulting products had the following characteristics:

| | Compound L | Compound D | Compound M |
|---|---|---|---|
| Analysis: | | | |
| Total solids per cent | 33.0 | 33.0 | 34.1 |
| Total acidity as $H_2SO_4$ per cent | 9.8 | | 10.6 |
| Oil and asphalt | 9.1 | | 8.4 |
| Physical tests: | | | |
| Furol vis./122° F. | 94 | 710 | 828 |
| Absolute pour ° F. | +10 | +45 | +45 |
| pH of a 10% solution | 0.8 | 0.92 | 0.85 |
| *Neutralized with ammonia* | | | |
| Analysis: | | | |
| Total solids per cent | 44.0 | 44.0 | 44.0 |
| Free $NH_3$ do | 5.2 | 5.5 | 5.3 |
| Physical tests: | | | |
| Furol vis./122° F. | 15 | 24 | 16 |
| Absolute pour ° F. | −5 | −10 | 0 |
| pH of a 10% solution | 9.5 | 9.5 | 9.45 |

Separate portions of an emulsion of crude oil and water which had stood for three hours and contained 19–20% of bottom sediment and water, were treated with Compounds D, L and M, respectively. These compounds were used as 10% solutions, each treatment being conducted with 2 cc. of treating agent per 100 cc. of emulsion. The results were as follows:

| Minutes | Bath °F. | | Acid compound L | Acid compound M | Acid compound D |
|---|---|---|---|---|---|
| | | | Cc. | Cc. | Cc. |
| 0 | 146 | All samples placed in bath | | | |
| 20 | 145 | Water separated | 12.5 | 3.3 | 12.0 |
| 50 | 143 | Water separated | 20.0 | 12.5 | 18.5 |
| | | Sludge | 0 | 1.0 | 1.5 |
| 75 | 140 | Water separated | 20.0 | 15.0 | 19.0 |
| | | Sludge | 0 | 0 | 0.5 |
| 105 | 144 | Water separated | 20.0 | 16.0 | 19.7 |
| | | Sludge | 0 | 0 | 0 |
| 120 | 148 | Water separated | 20.0 | 16.0 | 19.7 |
| | | Sludge | 0 | 0 | 0 |

| Centrifuge results: | Percent | Percent | Percent |
|---|---|---|---|
| B. S. & W. | 1.2 | 7.0 | 1.3 |
| Water | 1.2 | 7.0 | 1.3 |
| B. S. | 0 | 0 | 0 |

An emulsion of crude oil and water which had stood for 82 days and contained 57% of bottom sediment and water was treated separately with Compounds D, L and M in 10% water solution. In each case, 0.6 cc. of treating agent per 100 cc. of emulsion were employed. The results were as follows:

| Minutes | Bath °F. | | Acid compound L | Acid compound M | Acid compound D |
|---|---|---|---|---|---|
| | | | Cc. | Cc. | Cc. |
| 0 | 120 | All samples placed in bath | | | |
| 9 | 121 | Water separated | 38.0 | 1 | 5.0 |
| 12 | 122 | All samples stirred gently | | | |
| 14 | 124 | Water separated | [1] 56.0 | 1 | 10.0 |
| 19 | 125 | do | 56.0 | 1 | 19.0 |
| | | Sludge | 2.0 | | [3] |
| 29 | 126 | Water separated | 57.0 | 2 | 40.0 |
| | | Sludge | 1.0 | | 17.0 |
| 41 | 126 | Water separated | 57.0 | 4.5 | 50.0 |
| | | Sludge | 0.6 | | 6.0 |
| 69 | 121 | Water separated | 57.0 | 14.0 | 53.0 |
| | | Sludge | 0 | | 4.0 |

| Centrifuge results: | Per cent | Per cent | Per cent |
|---|---|---|---|
| B. S. & W. | 0.3 | [2] | 0.4 |
| Water | 0.2 | [2] | 0.3 |
| B. S. | 0.1 | [2] | 0.1 |

[1] Very clear water broken out.
[2] Not centrifuged.
[3] No definite line.

It will be noted that in this case the treating agent from the light extract showed marked superiority over the other two. A similar marked superiority was exhibited by Compound L when the agents were used in the alkaline state.

An emulsion of crude oil and water which had stood for two days and contained 32—33% of bottom sediment and water, was treated separately with Compounds D, L and M in 10% water solutions. In each case 1.5 cc. of treating agent per 100 cc. of emulsion were used. The results were as follows:

| Minutes | Bath °F. | | Alkaline compound L Cc. | Alkaline compound M Cc. | Alkaline compound D Cc. |
|---|---|---|---|---|---|
| 0 | 122 | All samples placed in bath | | | |
| 10 | 122 | Pipe line oil | 20.0 | 0 | 0 |
| 30 | 123 | Pipe line oil | 42.0 | 0 | 0 |
| 60 | 126 | Pipe line oil | 49.0 | 0 | 0 |
|  |  | Water separated | 0.5 | Trace | Trace |
| 75 | 132 | Pipe line oil | 53.5 | 0 | 0 |
|  |  | Water separated | Trace | Trace | Trace |
| 100 | 138 | Pipe line oil | 54.0 | 0 | 40.0 |
|  |  | Water separated | Trace | Trace | Trace |
| 115 | 138 | Pipe line oil | 55.0 | 0 | 47.0 |
|  |  | Water separated | Trace | Trace | Trace |
| 135 | 137 | Pipe line oil | 56.0 | 0 | 48.0 |
|  |  | Water separated | 0.5 | Trace | 1.0 |

In each case the sulfonic bodies from the light ends of the lubricating oil extract proved to be most effective. There appeared to be a general decrease in effectiveness as the average boiling point increased. In all cases, however, the sulfonic body from the extract is superior to a sulfonic body from a non-extracted oil of the same general properties.

In the experiments described in the foregoing examples, an elevated temperature was employed to aid in the demulsification. It is to be understood that an elevated temperature was employed in these experiments because such temperature was necessary for the use of sulfonic bodies derived from unextracted petroleum oil, and it was desired to carry out the experiments under the same conditions. Satisfactory demulsification can be secured with the demulsifiers of the present invention without resorting to the conjoint use of elevated temperatures.

It is to be understood that the foregoing examples are not intended to define the scope of the present invention, which is defined in the appended claims in which the expression "sulfonic bodies" is intended to include the sulfonic bodies of the character described above in the acid, alkaline and neutral state. Whenever the term "a non-paraffinic extract of a petroleum oil" is used in the appended claims, reference is had to an extract which is obtained by treating petroleum oil with a selective solvent such as phenol, nitro-benzene, furfurol, or the like, which extracts certain constituents from the oil by virtue of its selective solvent power for such constituents and not by reacting with such constituents, as distinguished from the acid sludges that are obtained by treating petroleum oils with sulphuric acid.

I claim:

1. A method for breaking a petroleum emulsion of the water-in-oil type which comprises subjecting the emulsion to the action of a demulsifying agent comprising a sulfonic body derived from a non-paraffinic extract of a petroleum oil boiling within the lubricating oil range.

2. A method for breaking a petroleum emulsion of the water-in-oil type which comprises subjecting the emulsion to the action of a demulsifying agent comprising a sulfonic body derived from the lighter portion of a non-paraffinic extract of a petroleum oil boiling in the lubricating range.

3. A method for breaking a petroleum emulsion of the water-in-oil type which comprises subjecting the emulsion to the action of a demulsifying agent comprising a sulfonic body obtained by combining the sludges of the first few stages of a multi-stage sulfuric acid treatment of a non-paraffinic extract of a petroleum oil boiling in the lubricating range.

4. A process for breaking a petroleum emulsion of the water-in-oil type which comprises subjecting the emulsion to the action of a demulsifying agent comprising a sulfonic body formed by combining the last few sludges of a multi-stage sulfuric acid treatment of a non-paraffinic extract of a petroleum oil boiling in the lubricating range.

5. A demulsifying agent for water-in-oil emulsions comprising a sulfonic body derived from a non-paraffinic extract of a petroleum oil boiling within the lubricating oil range.

6. A demulsifying agent for water-in-oil emulsions comprising a sulfonic body derived from the lighter portion of a non-paraffinic extract of a petroleum oil boiling in the lubricating oil range.

7. A demulsifying agent for water-in-oil emulsions comprising a sulfonic body obtained by combining the sludges of the first few stages of a multi-stage sulfuric acid treatment of a non-paraffinic extract of a petroleum oil boiling in the lubricating range.

8. A demulsifying agent for water-in-oil emulsions comprising a sulfonic body formed by combining the last few sludges of a multi-stage sulfuric acid treatment of a non-paraffinic extract of a petroleum oil boiling in the lubricating range.

9. A demulsifying agent for water-in-oil emulsions comprising a sulfonic body derived from a phenolic extract of a petroleum oil boiling within the lubricating oil range.

10. A demulsifying agent for water-in-oil emulsions comprising a sulfonic body derived from a non-paraffinic extract of a petroleum oil boiling within the lubricating oil range and an oil layer sulfonic body obtained by the treatment with sulfuric acid of a mixed base oil boiling within the lubricating oil range.

11. A method for producing a demulsifying agent for water-in-oil emulsions which comprises subjecting a mixed base oil boiling within the lubricating oil range to extraction with a solvent having a selectivity for non-paraffinic hydrocarbons, subjecting the extract so obtained to treatment with concentrated sulfuric acid whereby a sludge is produced and recovering the demulsifying agent from the sludge.

12. A method for producing a demulsifying agent for water-in-oil emulsions comprising subjecting a mixed base petroleum oil boiling within the lubricating oil range to extraction with a solvent having selectivity for non-paraffinic hydrocarbons, subjecting the extract so obtained to distillation, recovering an overhead constituting less than half the volume of the extract, subjecting this overhead to a treatment with concentrated sulfuric acid whereby a sludge is formed and recovering the demulsifying agent from this sludge.

13. A method for producing a demulsifying agent for water-in-oil emulsions comprising subjecting a mixed base petroleum oil boiling within the lubricating oil range to extraction with a solvent having selectivity for non-paraffinic hydrocarbons, subjecting the extract so produced to the action of concentrated sulfuric acid in a multiplicity of stages whereby a sludge is formed in each stage, combining the sludges of the first few stages and recovering the demulsifying agents from said combined sludges.

14. A method for producing a demulsifying agent for water-in-oil emulsions comprising subjecting a mixed base petroleum oil boiling within the lubricating range to extraction with a solvent having a selectivity for non-paraffinic hydrocarbons, subjecting the extract so obtained to the action of concentrated sulfuric acid in a multiplicity of stages whereby a sludge is formed in each stage, combining the sludges of the last few stages of the acid treatment and recovering the demulsifying agent from said combined sludges.

BRADSHAW F. ARMENDT.